Oct. 11, 1932.  W. H. HAUPT  1,882,583
MEASURING DISPENSER
Filed Feb. 21, 1931  6 Sheets-Sheet 1

INVENTOR
Walter H. Haupt
BY
ATTORNEY

Oct. 11, 1932.  W. H. HAUPT  1,882,583
MEASURING DISPENSER
Filed Feb. 21, 1931  6 Sheets-Sheet 4

INVENTOR
Walter H. Haupt
BY
ATTORNEY

Oct. 11, 1932.  W. H. HAUPT  1,882,583
MEASURING DISPENSER
Filed Feb. 21, 1931   6 Sheets-Sheet 5

Oct. 11, 1932.  W. H. HAUPT  1,882,583
MEASURING DISPENSER
Filed Feb. 21, 1931   6 Sheets-Sheet 6

Patented Oct. 11, 1932

1,882,583

UNITED STATES PATENT OFFICE

WALTER H. HAUPT, OF LUDLOW, KENTUCKY, ASSIGNOR TO AUGUSTINE DAVIS, JR., OF CINCINNATI, OHIO

MEASURING DISPENSER

Application filed February 21, 1931. Serial No. 517,444.

The invention relates to the type of dispenser for gasolene and other liquids having twin measuring chambers provided with valve mechanism which is automatically reversed at intervals as long as liquid is pumped to the measuring chambers, so that each chamber in turn is filled with liquid while the other empties. The invention relates more especially, though not necessarily exclusively, to dispensers of this kind in which the operation of the reversing mechanism is effected or initiated by pressure developed on the liquid when each chamber is completely filled and its vent is closed. However, the operation of the reversing mechanism may be brought about in other ways, by or dependent upon the liquid, after each quantity has been measured, provided that the actuation of the reversing mechanism be independent of the registering action of the counter hereinafter referred to.

In order to prevent "over-lapping", that is to say, reversal of the valve mechanism before a chamber has been completely emptied, an automatic lock has been devised which keeps the reversing mechanism from being thrown until each measured quantity is completely out of its chamber, this lock being controlled by a relay device, preferably in the nature of a fluid-pressure cylinder or bellows, from a float in or in communication with the discharge conduit. Such a plan is disclosed in the prior application of Paul S. Shield and myself, Serial No. 419,802, filed January 10, 1930.

A counting indicator registers for the purchaser and the attendant the gallons or other quantities which are measured. It is known to operate the counter by the reversing mechanism, in which event the quantities are registered at the times of reversal, that is to say each quantity is registered after it has been measured but before it is actually discharged from its measuring chamber.

It is an important object of this invention to provide a simple, reliable and effective mechanism and system of control whereby the registration of the quantities is delayed until they are entirely out of the measuring chambers.

In the preferred embodiment illustrated herein, a counter-actuator is preliminarily operated by or with each operation of the reversing mechanism. This preliminary operation or stroke of the counter-actuator does not effect registration of the quantity, but stores up power in a spring or weight which will return the actuator and thereby cause the counter to register the quantity. Such return is temporarily prevented by an automatic detainer, and this detainer is released at the proper time by a fluid-actuated device which is controlled by a float associated with the discharge passage.

However, I do not necessarily limit myself to this precise organization and mode of operation, since the control of the counter through an arrangement controlled by the outflowing measured quantities, so as to secure delayed registration, may be embodied in numerous different forms of execution, and indeed the counter might even be controlled from the float through mechanical connections. The operation of the reversing mechanism must be effected independently of the registering action of the counter in order that an additional quantity shall not be released upon the registration of the last quantity ordered.

It is important to retain the feature of the reversing mechanism lock which insures against overlapping, and which affords an interval, air space, or low liquid condition between the successive quantities which are discharged. In accordance with one part of the present invention this locking and unlocking feature is associated with the delayed registration feature, thereby securing simplicity and great reliability. This is realized by relating the lock and the counter-actuator in such manner that said actuator releases the reversing mechanism lock, the release being preferably effected at or about the conclusion of the registering stroke. The release of the lock does not effect the actuation of the reversing mechanism. Consequently if the attendant cuts off the supply of liquid, or relieves the pressure on the liquid, during the emptying from its chamber of the last quantity of a total ordered by the customer, the reversing mechanism will not be thrown when the counter registers this last quantity and the lock is then released.

The specific relay device illustrated in the aforesaid Haupt & Shield application for controlling the reversing mechanism lock was an air-operated servo-motor supplied by compressed air from an air-pump driven by the motor which drives the gasoline pump. The air in that instance was also utilized to hasten the emptying of the measuring chambers. I find that the use of air is unnecessary, and have simplified the dispenser materially by utilizing the liquid under pressure of the pump that supplies the measuring chambers. This constitutes one of the specific features of novelty of the present invention, applicable to control of the registering mechanism lock or of the counter or both. Details affecting this liquid pressure device and of the float and float chamber which control it will be described as the specification proceeds.

In order to insure registration of the last gallon of any gallonage delivered to the customer, it is necessary that pumping of liquid to the dispenser continue until after the counter starts on its final registering stroke. It is equally important that the pumping of liquid to the chambers be then discontinued before the reversing mechanism lock is again released, since otherwise the dispenser would continue in operation and deliver one or more extra gallons. The pumping of liquid to the chambers can be stopped by stopping the motor or by operating a master valve or by doing both. The valve is preferably a supply valve which opens and closes the supply passage conducting liquid to the measuring chambers and reversing mechanism, but by-pass valves which short-circuit pumps are known.

In the preferred form of execution of the invention these objects are attained in the following manner. A control mechanism is operated by a manually operated rod or its equivalent and is preferably caught and held in the dispensing condition by a detent, which detent is preferably releasable by a sufficient withdrawal movement of the manually operated means. The control mechanism controls the motor or the master valve or both. Between the control mechanism and the counter, or the counter-actuator, there is an interlock of such nature that while the counter-actuator is held in its second position the control mechanism can not be moved manually or automatically to stop the motor and/or to cause the master valve to operate to discontinue the supply of energy for actuating the relay device. When the last gallon has passed the float chamber, however, and in consequence thereof the counter has started on its registering stroke, and before the reversing mechanism lock is again released, the interlock is freed so that the control mechanism can be moved to the condition in which the motor is stopped and/or the master valve prevents further delivery of liquid to the measuring chambers or further application of liquid pressure to the reversing mechanism.

Other objects and features of the invention will become apparent to those skilled in the art from a consideration of the illustrative embodiment shown in the accompanying drawings and described in the body of the specification.

In the said drawings, which form part hereof:

Figure 1:
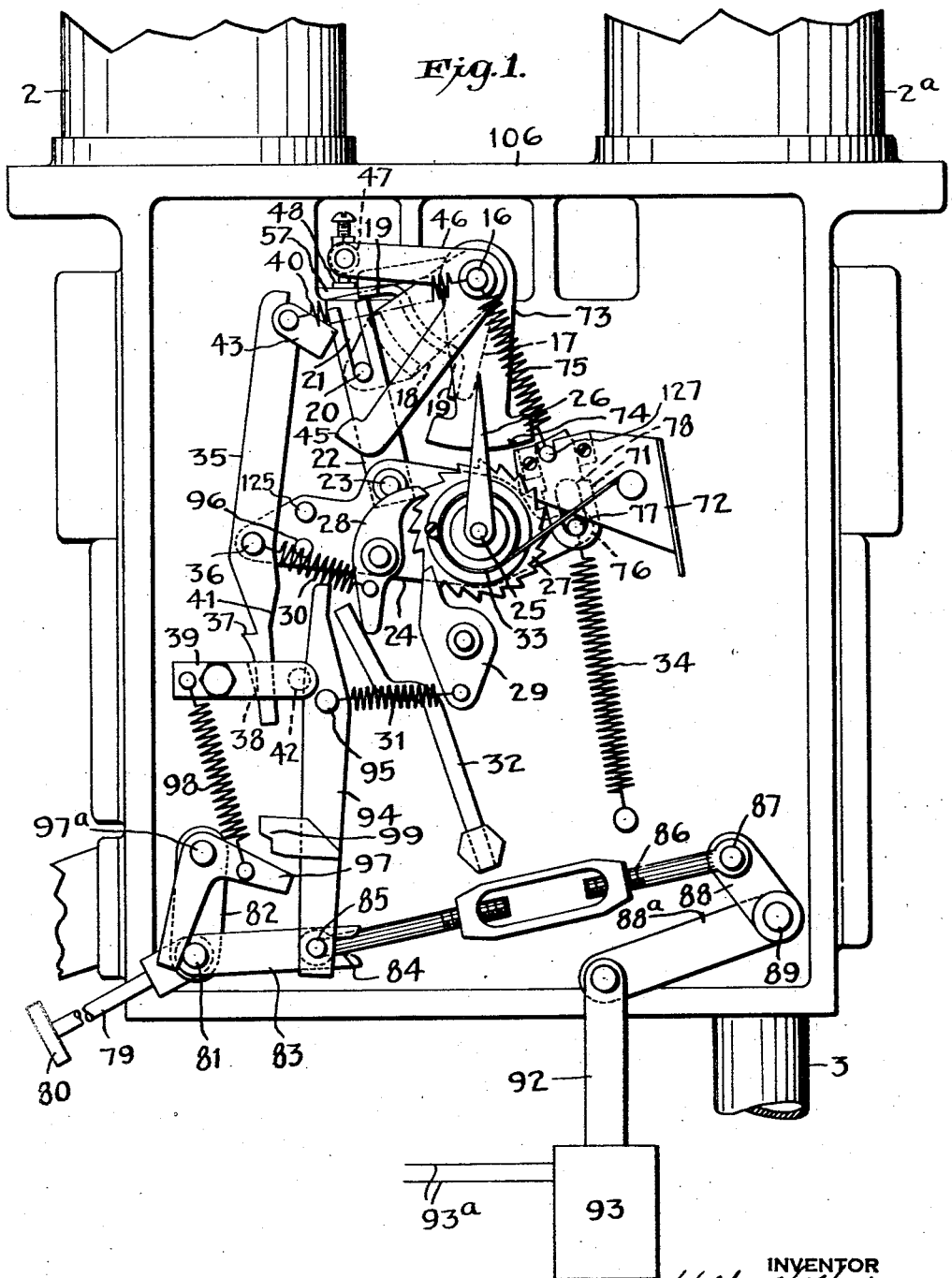
Fig. 1 is a fragmentary elevation of the dispenser with a cover plate removed to show the counter mechanism, the starting and stopping arrangement and associated parts.

The twin measuring chambers are marked 2 and 2$^a$. 3 is a supply passage and 4 is a discharge passage, to the end of which latter the hose 5 is connected. A bull's eye or sight glass 5$^a$ is preferably placed in the wall of the outer portion of the discharge passage so that the unit quantities of liquid can be seen passing from the dispenser.

The chambers preferably have vent openings 6 at the top, these vent openings being interconnected by a pipe 7 and being closed alternately, when each chamber is completely filled, by float valves 8. Connected with the pipe 7 is an inwardly opening, spring-closed air-admission valve 105.

The supply passage 3 is connected with a storage tank and contains a pump 9 which is driven by a motor 10, preferably though not necessarily an electric motor. In common with other dispensers of this type, a relief valve 11 is preferably placed in the supply line to divert liquid into a return line 12 and thereby limit the pressure that can be placed on the liquid going to the chambers and the reversing mechanism. The supply passage 3 is connected with a master valve chamber 120 in the casting 166 of the dispenser. This valve chamber communicates through an opening, which it is not necessary to illustrate, with a continuation passage 3ª in the casting, the ends of this passage opening into the opposite ends of a slide valve chamber 121.

The reversing mechanism illustrated is of a known type comprising a piston 13 exposed to the liquid pressure developed in the measuring chambers, a four-way slide valve 14 in the chamber 121 and a spring-toggle valve-actuating device 15. The valve connects each measuring chamber alternately with the supply and discharge passages, one chamber being connected with the supply while the other is connected with the discharge and vice-versa. When either chamber is empty and the other is filled with liquid, the pressure developed on this liquid by reason of the corresponding vent 6 being closed acts on the piston 13, moving the latter to the right or to the left depending upon its last position. This movement stores up power in the snap-over action device 15, and after the latter is moved past center its spring acts to reverse the position of the valve. This operation is repeated automatically while liquid continues to be supplied to the measuring chambers.

The valve actuating device 15 need not be described in detail since any suitable or known device of this character may be employed. Suffice it to say that it is connected with a rock-shaft 16 which is connected by an arm 101 with the piston and that it is also connected by an arm 102 with another rock-shaft 103, which has another arm 104 connected with the valve.

The dispenser as thus far described is in accordance with the Carbonaro reissue Patent No. 17,287, dated May 7, 1929, but the invention is not limited to this form of execution. In the Shield application Serial No. 129,761, filed August 17, 1926, a modification of the Carbonaro dispenser is shown, in which a single slide combines the functions of both piston and valve, a special form of valve actuating device being provided to make this design operative. Still other reversing mechanisms which operate automatically by virtue of the liquid, and not necessarily by reason of pressure developed on the liquid, are known.

Figure 5:
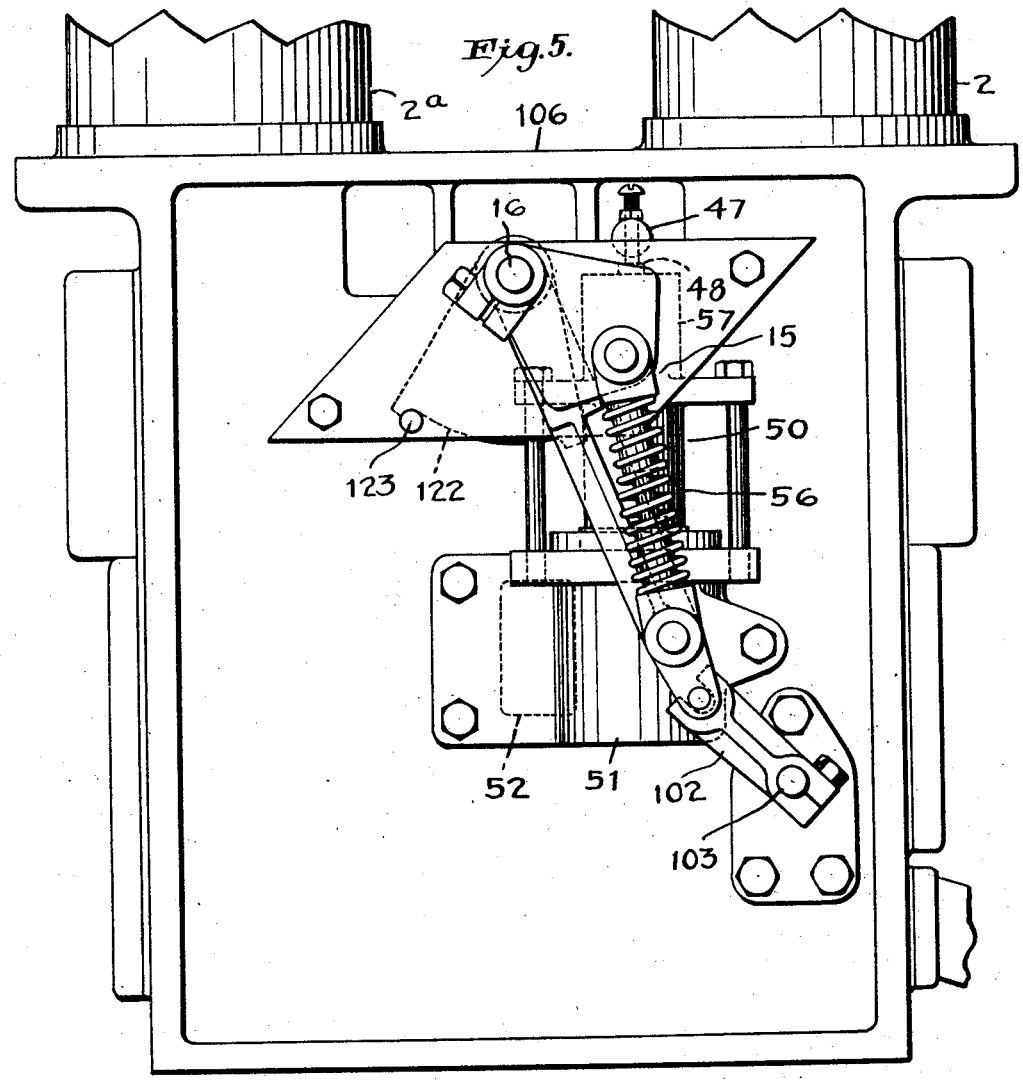
Fig. 5 is an elevation looking at the opposite side of the dispenser from Figs. 1 and 2. It will be understood that a cover plate which conceals the parts shown in this view has been removed.
Figure 6:
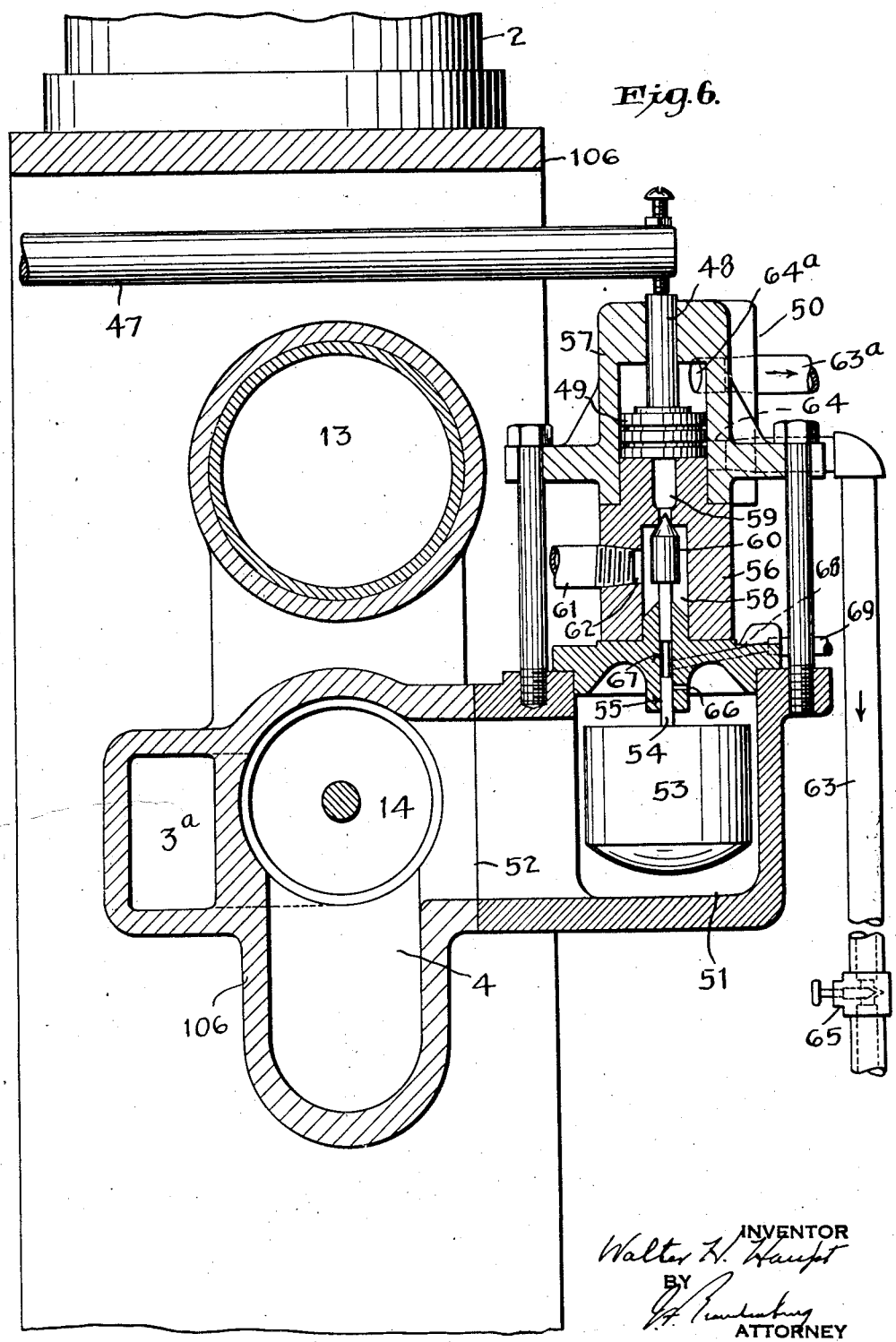
Fig. 6 is a section taken on the line 6—6 of Fig. 4.

Returning to the illustrated embodiment, the piston 13 operates the rock-shaft 16. This shaft is rocked clockwise for one reversal of the reversing mechanism, counter-clockwise for the next reversal, and so on. The movement of the shaft, and of the piston 13, in opposite directions is limited by any suitable means such as the duplex stop arm 122 indicated in Fig. 5, this arm being fixed to the shaft 16 and cooperating with a fixed stop pin 123.

A yoke arm 17 fixed to this shaft actuates an arm 18, which is loose on the shaft and which has a range of movement between the abutments 19 of the yoke arm. The arm 18 has a pin 20 which preferably works in a slot 21 of an arm 22. The arm 22 is pivoted at 23 to a counter-actuator arm 24, which pivots freely about the fixed axis of the counter shaft 25. An indicator hand 26 is secured to the counter shaft to move over a dial, not shown. A ratchet wheel 27 is suitably coupled to the shaft 25 to be acted upon by an actuating pawl 28 pivoted on the arm 24. A holding pawl 29 is pivoted on a stationary support, and springs 30 and 31 urge the pawls to their duty.

A re-setting arm 32 having a handle outside the casing is movable to disengage the pawls 28 and 29 to cause the counter to return to zero under the action of a spring 33.

A spring 34 serves to hold the counter-actuator in its upper or first position, and to restore it to that position.

A detainer bar 35 is pivoted intermediate its ends, at 36, on the counter-actuator arm 24. The lower portion of this bar is formed like a hook with a shoulder 37 to engage the corner 38 of a keeper 39, to detain the actuator arm 24 in its lower or second position. A spring 40 urges the detainer in a manner to engage automatically with the keeper, but for greater certainty the back of the detainer hook is formed with a cam edge 41 which rides on a fixed pin 42 during a slight downward over-travel of the actuator arm 24 and detainer 35 under the action of the reversing mechanism. This positively forces the shoulder 37 beneath the corner 38. Movement of the detainer under the action of the spring 40 is limited by a stop 125 on the counter-actuator 24.

On the upper end of the detainer there is a pivoted contact piece 43 which normally rests by gravity in the position determined by a stop shoulder 44 on the piece contacting the edge of the detainer bar. This position is such that, when the detainer is caught down, the end 45 of an angular arm 46 loosely swung on the rock-shaft 16 will exert thrust through the piece 43, when said arm is moved to the left, thereby swinging the detainer bar on its pivot and disengaging it from the keeper 39.

To the other end of the arm 46 there is fixed a rod 47 which extends through an opening in the casting 106 of the dispenser to a point where it will be acted upon by the stem 48 of the piston 49 of a relay device 50. This device is preferably located directly over a float chamber 51 and integral therewith, and the float chamber is directly off the discharge passage 4, with which it communicates by a port 52, so that when a measured unit quantity is flowing past the port 52 the float chamber is full or partly full of the liquid, whereas in the interval between the discharge of unit quantities the float chamber is drained of liquid.

A float 53 in tthe float chamber has a stem 54 guided in a passage 55 extending through the closed top of the float chamber into a connecting portion 56 which unites the float chamber and the cylinder 57 of the servo-motor device. Said portion contains a valve chamber 58 forming part of a duct for conducting pressure fluid to the inlet port 59 of the cylinder 57. A needle valve 60 on the upper end of the stem 54 operates in this chamber, and when the float is raised closes the entrance of the port 59. The remainder of said duct consists of a tube 61 extending from a port 62 in the valve chamber to the supply passage 3, with which it is connected at a point between the pump and the measuring chambers.

A drain-back 63 is connected with a port 64 at the lower end of the cylinder 57 to allow liquid to escape from the cylinder and the piston 49 to descend when the valve 60 is closed. This drain-back is constantly open, but is restricted at a suitable point, as by means of a needle valve 65. Another drain-back 63ª leading from a port 64ª at the upper end of the cylinder disposes of any gasolene that may make its way past the piston. All drain-backs referred to in this specification lead directly or indirectly to the storage tank with which the supply passage 3 is connected.

A small opening 66 is drilled from the top part of the float chamber to the guide passage 55, where it will communicate with an annular space 67 formed by reducing a portion of the stem 54. A passage 68 extends from this space to the outside, where it is connected with a drain-back 69. This provision insures venting of a sufficient amount of air or vapor from the float chamber when liquid enters it to cause the float to respond promptly. Before liquid, or any appreciable amount of it, can escape by this vent route, the vent is closed by the full diameter part of the stem 54 blanking the opening 66.

Figure 2:
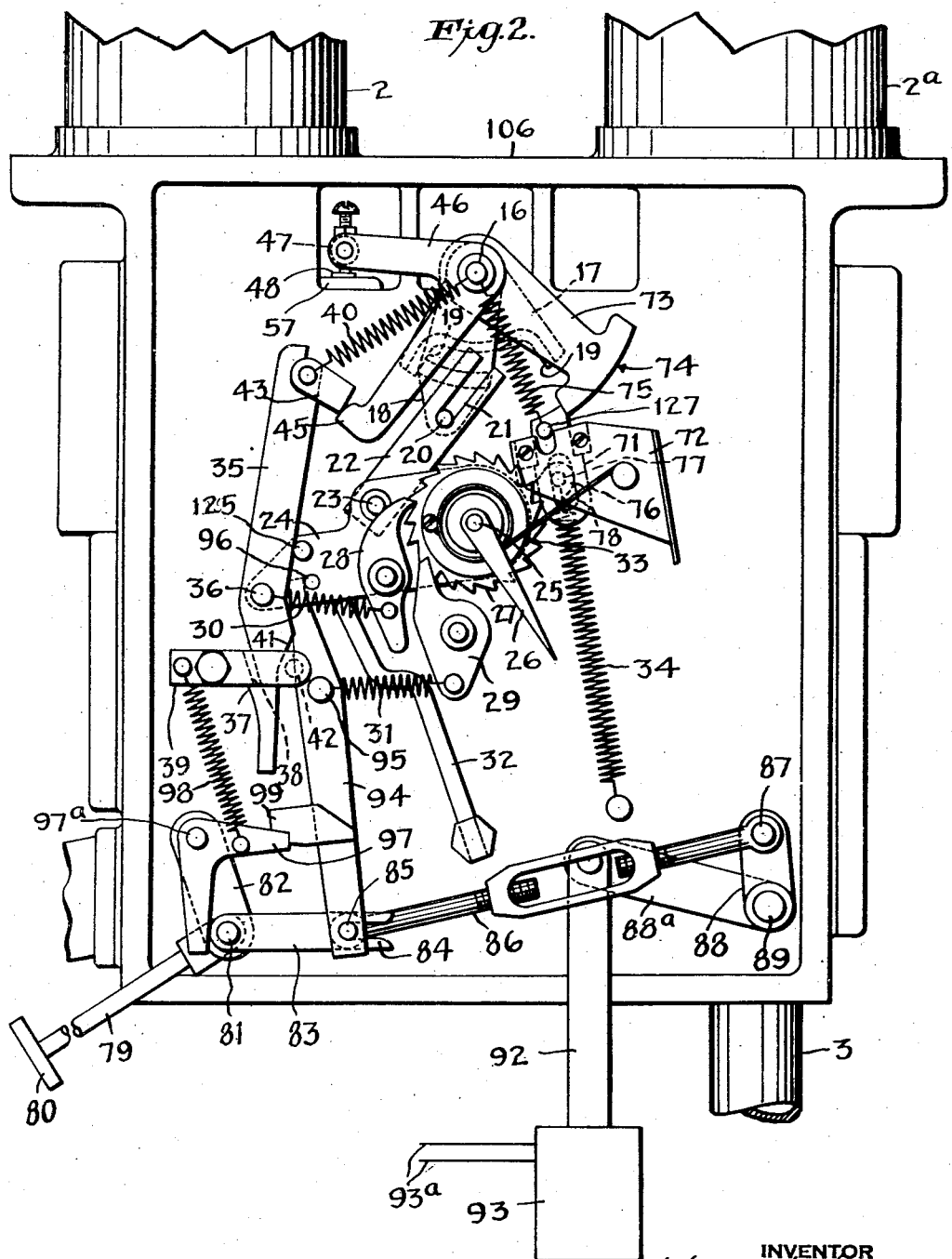
Fig. 2 is a view similar to Fig. 1, showing the parts in another condition.

From the foregoing description it will be understood that when the piston 49 is raised by pressure fluid the arm 46 is swung to the left in Figs. 1 and 2 to free the detainer 35. The return of the piston 49, the arm 46 and the connection 47 to their original positions is effected by gravity. Naturally, the force of springs and the force of gravity are generally interchangeable.

The lock for the reversing mechanism takes the form of a bolt 71 slidably guided on a stationary bracket 72, this bolt when projected blocking movement of a lock arm 73 fixed to the rock-shaft 16. This arm has an arcuate terminal portion 74 of such width that in the right-hand rest position of the arm 72 and rock-shaft 16 in Figs. 1 and 2 the left-hand end of said terminal portion is opposed by the right side of the bolt, keeping the rock-shaft from turning clockwise, whereas when the said arm is in the left-hand rest position the right end of the terminal portion 74 is opposed by the left side of the bolt. The bolt is projected by a spring 75. A lost-motion connection between the bolt and the counter-actuator 24 causes the bolt to be retracted by the return or registering stroke of said actuator substantially at or immediately after the moment when registration is effected. For this purpose the actuator arm is shown provided with a tail 76 having a pin 77 which operates in a slot 78 of the bolt, the arrangement being such that the pin comes in contact with the bottom of the slot and then retracts the bolt at the end of the registering stroke. The downward movement of the bolt, and consequently the upward movement of the actuator 24, are limited by a pin 127 on the bolt contacting the bottom of a notch in the bracket plate 72.

The starting and stopping control mechanism for the dispenser is shown for convenience as being operated by a rod 79 having a knob 80. This rod may be pivoted at 81 to a hanger link 82, to which is also pivoted a thrust bar 83 having a slotted end 84. The bottom of the slot in this bar, when the bar is pushed in, thrusts against a pin 85 on an adjustable link 86, the inner end of which is pivoted at 87 to an arm 88, which is fixed to a rock-shaft 89. This rock-shaft is connected by an arm 90 to a master valve 91. By master valve is meant a valve in or connected with the supply passage 3 and so related thereto that in one condition of the valve liquid can be pumped to the measuring chambers or against the piston of the reversing mechanism, whereas in another position of the valve, supply of liquid or application of pressure is discontinued. As shown, the valve is preferably located in the supply conduit, beyond the pump, to open or close this passage. If that is the case, the valve is opened when the rod 79 is pushed in.

Another arm 88ª fixed to the rock-shaft 89 is connected by a link 92 to a starting and stopping member controlling the motor 10. In the case of an electric motor this member is a switch. The schematic indication 93 may be taken as representing such switch or power-control organ, 93ª representng electric conductors, or other conductors. Obviously, a fluid-operated motor may be used in place of an electric motor, in which event a valve controlling the motive fluid would be the equivalent of the switch.

An interlock arm 94 is pivoted intermediate its ends, at 95, on a fixed support, and the lower end of this arm is pivotally connected with the pin 85. A pin 96 on the counter-actuator 24 comes into blocking relation to the upper end of said interlock arm, when said actuator arm is depressed to its second position. This prevents the starting and stopping arrangements from returning to the power-off condition until the counter-actuator is freed to start on its registering stroke.

When the control mechanism is moved manually to the dispensing condition, it is caught in this condition by a detent 97 urged by a spring 98 to coact with an abutment projection 99 on the arm 94. The detent 97 may be swung on the same fixed pivot 97ª that supports the hanger link 82, the hanger link and the detent being, of course, free to move independently of each other.

The rod 79 and slotted link 83 can be withdrawn from the remainder of the control mechanism, and it is by such withdrawal that the detent 97 is preferably disengaged from the abutment 99. The pivot pin 81 is extended to act on the tail of the detent when the rod 79 is pulled outward.

The operation of the illustrating embodiment of the invention will be described. It is to be understood, however, that under various permissible modifications of the apparatus the precise mode of operation may also be modified.

Figure 4:
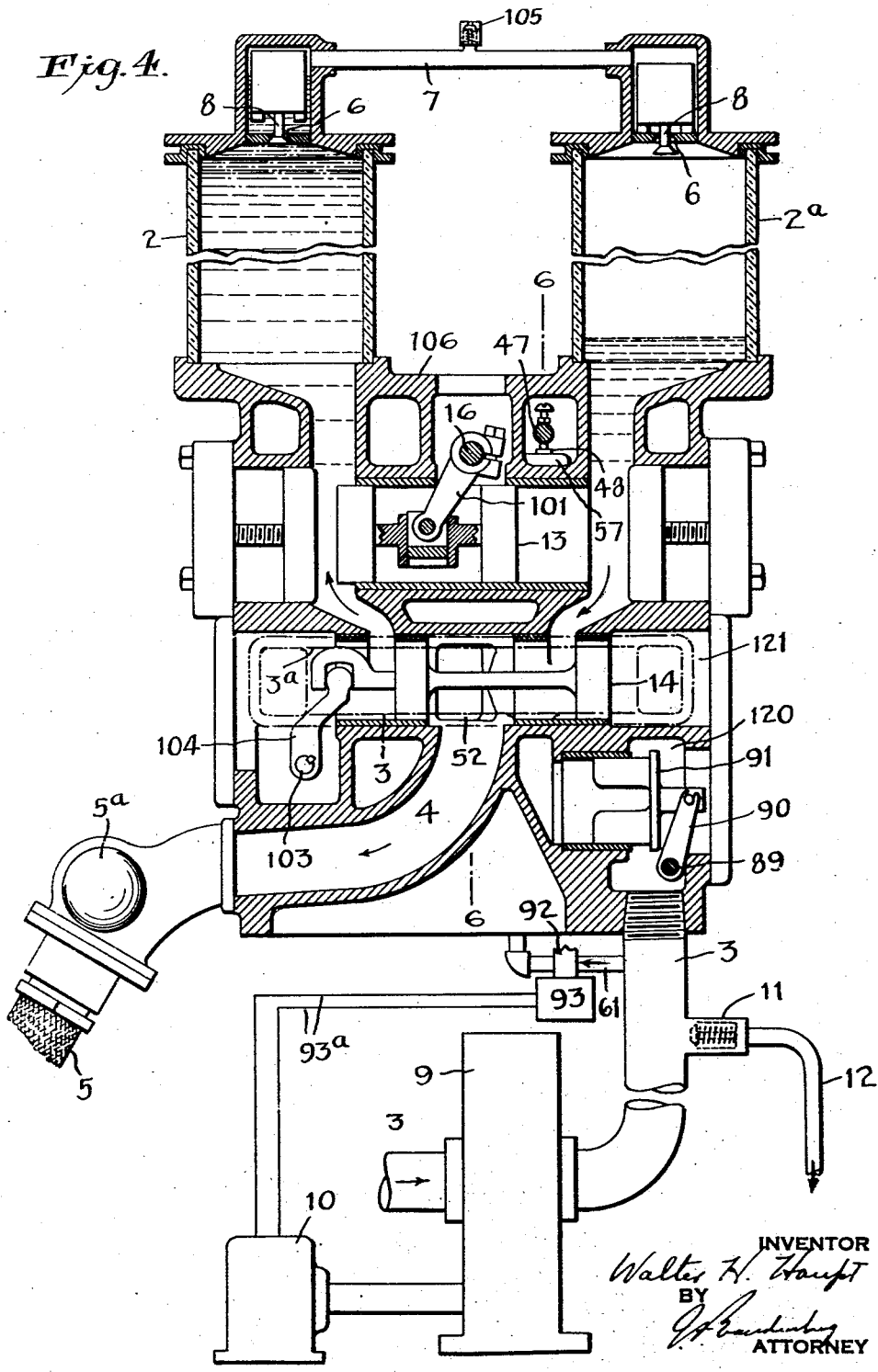
Fig. 4 is a central vertical section through the dispenser parallel with the planes of Figs. 1–3, certain parts being in elevation and certain portions being broken away. The passage 3$^a$ indicated in broken lines in this view is actually in front of the plane of section.

Fig. 1 illustrates the condition of the counting and locking mechanism when the dispenser is not in use. The position of the rock-shaft 16 and the arms 17, 18, 22 and 73 correspond to the left-hand position of the piston 13 (Fig. 4), but it will be understood that at the end of a delivery the piston is as likely to be in its right-hand position, in which event these parts would be in reverse angular relations. In either event the counter-actuator 24 and parts subject thereto would be in the position shown. Terms of direction such as right-hand and left-hand are to be understood as if the various parts were being viewed from the same standpoint as in Figs. 1, 2 and 4.

To start the dispenser in operation the attendant pushes in the rod 79. While this rod is shown as being operated by a knob adjacent the dispenser it may be operated from a remote control through various connections. This movement of the rod acts through the linkage 83, 86, 88 to close the starting switch 93 and to open the supply valve 91. The pump 9 starts pumping gasolene to the measuring chamber 2, and this pressure fluid also passes through the duct 61 past the needle valve 60, then open, to the servo-motor relay device 50. The fact that this valve is open when the dispenser is not in operation and that the detainer releasing arm 46 is now swung to the left without accomplishing anything, is merely incidental and without significance.

The locking bolt 71 for the reversing mechanism, it will be observed, is held retracted by the counter-actuator 24, which in turn is sustained in its first position by the spring 34.

When the chamber 2 is filled the pressure on the liquid drives the piston 13 to its right-hand position, storing up power in the valve-actuating device 15 which in turn throws the valve to its left-hand position. The measured unit quantity starts to flow out of the chamber 2 into the discharge passage 4. The movement of the rock-shaft 16 produced by the piston causes the yoke arm 17 to move the toggle 18, 22 to and somewhat past its center line, and the straightening of the toggle depresses the counter-actuator arm 24 to and somewhat below its second position, the actuating pawl 28 sliding idly over a tooth of the counter ratchet 27 into engagement with a tooth below. This movement of the actuator carries the detainer bar 35 with it and in the slight over-travel the hook of this bar is cammed and spring-urged into catching relation to the keeper 39, which holds the actuator in its second position against the tension of the spring 34. Because of the incidental fact that the detainer releasing arm 45 was in its left-hand position when the retainer started down, the contact piece 43 encountered the top of that arm, and it is for this reason that said piece is pivoted, so that it can swing idly on top of said arm and not interfere with the movement of the detainer bar and of the actuator arm 24.

The movement of the actuator arm 24 to the second position also caused or permitted the bolt 71 to be projected into the path of the terminal of the lock arm 73, so that the reversing mechanism can not reverse the conditions of flow to and from the measuring chambers for the time being.

The liquid flowing from the measuring chamber 2 through the discharge conduit quickly causes the float-chamber 51 to be filled or partially filled, and this raises the float 53 and closes the needle valve 60. The piston 49 of the servo-motor 50 then descends, permitting the detainer releasing arm 46 to swing away from the detainer. The parts are now in the positions shown in Fig. 2. When the gallon or other quantity passes completely out of the measuring chamber and then passes beyond the port 52 to the float chamber, the float 53 descends, reopening the needle valve 60 and causing an impulse to be applied to the servo-motor 50, which acts to swing the detainer-releasing arm 46 to the left. This disengages the detainer 35 from the keeper 39, and the actuator 24 executes its registering stroke under the action of the spring 34. In this movement the pawl 28 moves the counter ratchet 27 the distance of one tooth and the indicator hand 26 one division on the dial, thereby registering the quantity which has been discharged from the measuring chamber and is flowing out through the discharge passage. This registration preferably occurs when the quantity registered is visible through the bull's eye 5ª.

Figure 3:
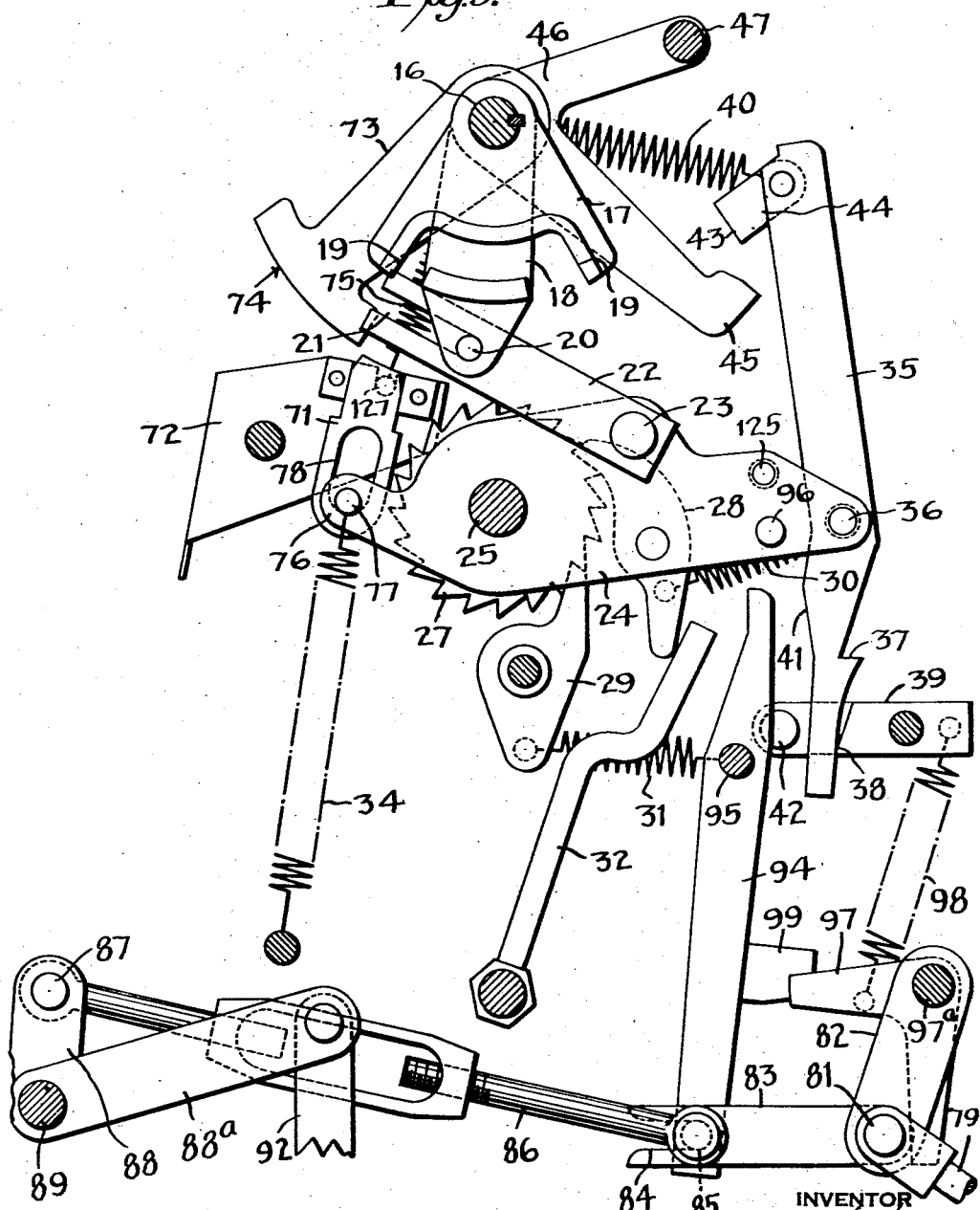
Fig. 3 is a sectional elevation, looking in the reverse direction to the point of view of Figs. 1 and 2, showing the parts is still another condition.

The upward movement of the actuator 24 flexes the toggle 18, 22 further to the right, in readiness for the next cycle of operations. At the end of the registering action the actuator 24 retracts the bolt 71 from blocking relation to the lock arm 73. The positions of the parts at this instant are shown in Fig. 3, except that in actual fact the rock-shaft 16 and parts connected thereto would be starting on the next reversal movement. Before this time the measuring chamber 2ª had been filled and the pressure on the liquid had been endeavoring to throw the piston 13 to the left to reverse the reversing mechanism. Consequently as soon as the lock is released the reversal takes place, the counter-actuator 24 is again moved to its second position and detained, the second gallon starts running out from its measuring chamber, and the cycle of operations which has been described is repeated.

If the customer asked for ten gallons, for example, the attendant watches for the registration of the ninth gallon on the indicator and then when the tenth gallon begins descending in its measuring chamber he can withdraw the rod 79 sufficiently to release the detent 97 that has been holding the starting and stopping arrangement in the power-on condition. The switch 93 and the master valve 91 are still kept in their operative positions, however, because the counter-actuator 24 is detained in its second position and the pin 96 on this actuator is in blocking relation to the upper end of the interlock arm 94, thereby holding the link 86 and the rock-shaft 89, and therefore the switch and the master valve in their dispenser-operating positions. This insures that energy will be available to be applied at the proper moment to the device 50 to unlatch the detainer 35 to permit the actuator 24 to move and register the last gallon. As soon, however, as the actuator 24 starts on this stroke, which it will complete under the tension of the spring 34, the pin 96 passes away from the end of the interlock arm 94 and the starting and stopping arrangement is free to move to the stop condition, in which the switch is open and the master valve closed (assuming the master valve to be a valve which opens and closes the supply passage). This stopping movement may be effected by a spring (not shown), or by pressure of the liquid against the master valve. The stopping action occurs before the actuator 24 retracts the bolt 71. Consequently assuming a measuring chamber to have been filled and the liquid to have been exerting pressure on the piston 13, seeking to reverse the mechanism and deliver an extra gallon, such excess delivery can not occur because the stopping of the motor or the closing of the master valve (the latter being the more positive) relieves the pressure on the liquid in the filled chamber.

Attention should be called to a change in the location of the float chamber 51 as compared with the location of the float chamber shown in the Haupt & Shield application Serial No. 419,802, which was referred to in the introductory part of this specification. In the dispenser illustrated in the said application the float chamber and is communication port were at the outer portion of the discharge passage adjacent the intake end of the hose. In the dispenser of the present application the float chamber has been moved up to a point where the reversing valve 14 discharges into the discharge passage 4: In fact, as shown, the float chamber and its port 52 are alongside the space in the reversing valve chamber 121 which lies between the two cylindrical portions of the reversing valve. The reason for this change has to do primarily with the function of the float, and of the relay device which it governs, in controlling the lock for the reversing mechanism. The present location of the float chamber insures a prompt response to the completion of the release of the contents of each measuring chamber, and therefore a prompt release of the lock. This is accomplished by reason of the fact that the float acts as soon as the liquid drops at the entrance to the discharge conduit rather than when the liquid drops at the intake end of the hose. The result is an important speeding up of deliveries, by eliminating a considerable portion of the gap between successive gallons or other quantities. One consequence of this is that it becomes possible to obtain a sufficiently fast delivery without the use of air pressure in the measuring chambers to hasten discharge, or the use of an air pump to produce the pressure.

The shortness of the fluid passage between the float operated valve 60 and the servo-motor or relay device 50 is also important in this connection. In the said Haupt & Shield application the servo-motor was remote from the valve and connected therewith by a considerable length of small pipe, whereas in the dispenser disclosed herein the servo-motor is connected directly with the valve. Whatever the nature of the operating fluid, this causes the servo-motor to respond much more promptly to the action of the float.

It will be apparent that the apparatus may be modified or altered by additions, omissions, substitutions, or re-arrangement, without departing from the spirit of the invention. The claims are intended to cover all the generic and specific features of the invention and all statements of scope which as a matter of language might be said to fall therebetween.

I claim:

1. In a liquid dispenser having twin measuring chambers, supply and discharge passages, and automatic reversing mechanism whereby each chamber in turn is connected with the supply passage while the other is connected with the discharge passage, the combination of a counter mechanism, mechanical connections whereby said counter mechanism is preliminarily operated by each operation of said reversing mechanism, and means for delaying the registering action of said counter mechanism beyond each corresponding operation of said reversing mechanism.

2. In a liquid dispenser having twin measuring chambers, supply and discharge passages, and automatic reversing mechanism whereby each chamber in turn is connected with the supply passage while the other is connected with the discharge passage, the combination of a counter mechanism, mechanical connections whereby said counter mechanism is preliminarily operated by each operation of said reversing mechanism, a detainer for restraining said counter mechanism after the completion of each corresponding operation of said reversing mechanism, and an automatic device for releasing said detainer.

3. In a liquid dispenser having twin measuring chambers, supply and discharge passages, and automatic reversing mechanism whereby each chamber in turn is connected with the supply passage while the other is connected with the discharge passage, the combination of a counter mechanism preliminarily operated by each operation of said reversing mechanism, a detainer for restraining said counter mechanism after the completion of each corresponding operation of said reversing mechanism, a fluid-actuated device for releasing said detainer, a duct connected with said device, a valve controlling said duct, and a float associated with the discharge conduit and controlling said valve.

4. In a liquid dispenser having twin measuring chambers, supply and discharge passages, and automatic reversing mechanism whereby each chamber in turn is connected with the supply passage while the other is connected with the discharge passage, the combination of a counter mechanism, mechanical connections whereby said counter mechanism is preliminarily operated by each operation of said reversing mechanism, a detainer for restraining said counter mechanism after the completion of each corresponding operation of said reversing mechanism, a fluid-actuated device controlling said detainer, a valve controlling said device, and operating means for said valve governed by the state of discharge.

5. In a liquid dispenser having twin measuring chambers, supply and discharge passages, and automatic reversing mechanism whereby each chamber in turn is connected with the supply passage while the other is connected with the discharge passage, the combination of a counter mechanism, mechanical connections whereby said counter mechanism is preliminarily operated by each operation of said reversing mechanism, a detainer for restraining said counter mechanism after the completion of each corresponding operation of said reversing mechanism, a fluid-actuated device controlling said detainer, a conduit connecting said device with said supply passage, a valve in said conduit, and operating means for said valve governed by conditions in said discharge conduit.

6. In a liquid dispenser having twin measuring chambers, supply and discharge passages, and automatic reversing mechanism whereby each chamber in turn is connected with the supply passage while the other is connected with the discharge passage, the combination of a counter, means for actuating the same to register the successive measured quantities, fluid-pressure means controlling said actuating means, a float chamber arranged to receive liquid from the emptying measuring chambers, a float in said float chamber and a valve operatively connected with said float and controlling said fluid-pressure device.

7. In a liquid dispenser having twin measuring chambers, supply and discharge passages, and automatic reversing mechanism whereby each chamber in turn is connected with the supply passage while the other is connected with the discharge passage, the combination of a counter, a counter-actuator having a reciprocal motion by the return stroke of which the counter is actuated, a spring for effecting said stroke, means actuated by each operation of said reversing mechanism to produce an initial stroke of said counter-actuator, a detainer for restraining the counter-actuator from executing its return stroke, and means for releasing said detainer after each measured quantity to be registered has left its measuring chamber.

8. In a liquid dispenser having twin measuring chambers, supply and discharge passages, and automatic reversing mechanism whereby each chamber in turn is connected with the supply passage while the other is connected with the discharge passage, the combination of a counter, a counter-actuator having a reciprocal motion by the return stroke of which the counter is actuated, a spring for effecting said stroke, means actuated by each operation of said reversing mechanism to produce an initial stroke of said counter-actuator, a detainer for restraining the counter-actuator from executing its return stroke, a fluid-actuated device for releasing said detainer, a valve controlling said fluid-actuated device, and means controlled by the measured and discharging quantities for operating said valve.

9. In a liquid dispenser having twin measuring chambers, supply and discharge passages, and automatic reversing mechanism whereby each chamber in turn is connected with the supply passage while the other is connected with the discharge passage, the combination of a counter, and means for causing said counter to register each measured quantity of liquid after it leaves its measuring chamber, said means including a fluid-pressure device connected with said supply passage, and float-actuated means controlling the admission of liquid to said device.

10. In a liquid dispenser having twin measuring chambers, supply and discharge passages, and automatic reversing mechanism whereby each chamber in turn is connected with the supply passage while the other is connected with the discharge passage, the combination of a counter comprising a shaft bearing a ratchet wheel, a pawl-bearing actuator arm pivoted on the counter shaft axis, a spring to move said actuator arm in the registering direction, means actuated by said reversing mechanism to move said actuator in the other direction, a detainer hook pivoted to said actuator arm, a keeper to be engaged by said detainer hook, and automatic means for disengaging said hook from said keeper.

11. In a liquid dispenser having twin measuring chambers, supply and discharge passages, and automatic reversing mechanism whereby each chamber in turn is connected with the supply passage while the other is connected with the discharge passage, the combination of a counter comprising a shaft bearing a ratchet wheel, a pawl-bearing actuator arm pivoted on the counter shaft axis, a spring to move said actuator arm in the registering direction, means actuated by said reversing mechanism to move said actuator in the other direction, a detainer hook pivoted to said actuator arm, a keeper to be engaged by said detainer hook, camming means for insuring such engagement, and automatic means for disengaging said hook from said keeper.

12. In a liquid dispenser having twin measuring chambers, supply and discharge passages, and automatic reversing mechanism whereby each chamber in turn is connected with the supply passage while the other is connected with the discharge passage, the combination of a rock-shaft connected with said reversing mechanism, a counter comprising a shaft bearing a ratchet wheel, a pawl-carrying actuator arm pivoted on the counter shaft axis, a spring to move said arm in the registering direction, a loose operating connection between said rock-shaft and said actuator arm to move the latter against the action of said spring, a detainer for restraining said actuator arm when thus moved, a detainer releasing arm, a fluid-actuated device connected with said detainer releasing arm, and control connections between said fluid-actuated device and said discharge conduit.

13. In a liquid dispenser having twin measuring chambers, supply and discharge passages, and automatic reversing mechanism whereby each chamber in turn is connected with the supply passage while the other is connected with the discharge passage, the combination of a counter comprising a shaft bearing a ratchet wheel, a pawl-bearing actuator arm pivoted on the counter shaft axis, a spring to move said actuator arm in the registering direction, means actuated by said reversing mechanism to move said actuator in the other direction, a detainer hook pivoted to said actuator arm, a keeper to be engaged by said detainer hook, a contact piece pivoted to said detainer hook, a releasing arm arranged to act on said contact piece, a device for actuating said releasing arm, and means having control connections with said discharge conduit for energizing said device.

14. In a liquid dispenser having twin measuring chambers, supply and discharge passages, and automatic reversing mechanism whereby each chamber in turn is connected with the supply passage while the other is connected with the discharge passage, the combination of a rock-shaft connected with said reversing mechanism, a counter comprising a shaft bearing a ratchet wheel, a pawl-carrying actuator arm pivoted on the counter shaft axis, a spring to move said arm in the registering direction, a loose operating connection between said rock-shaft and said actuator arm to move the latter against the action of said spring, a detainer for restraining said actuator arm when thus moved, a lock arm connected to said rock-shaft, locking means cooperative with said lock arm in both rest positions of the rock-shaft, automatic means for releasing said detainer, and means whereby said actuator arm releases said locking means at the end of the registering movement.

15. In a liquid dispenser having twin measuring chambers, supply and discharge passages, and automatic reversing mechanism whereby each chamber in turn is connected with the supply passage while the other is connected with the discharge passage, the combination of a rock-shaft connected with said reversing mechanism, a counter comprising a shaft bearing a ratchet wheel, a pawl-carrying actuator arm pivoted on the counter shaft axis, a spring to move said arm in the registering direction, a loose operating connection between said rock-shaft and said actuator arm to move the latter against the action of said spring, a detainer for restraining said actuator arm when thus moved, a lock arm connected to said rock-shaft, a bolt cooperative with said lock arm in both rest positions of the rock-shaft, automatic means for releasing said detainer, and a lost-motion connection between said bolt and said actuator arm.

16. In a liquid dispenser having twin measuring chambers, supply and discharge passages, automatic reversing mechanism whereby each of said chambers in turn is connected with the supply passage while the other is connected with the discharge passage, a pump for forcing the liquid through the supply passage, and a motor to drive said pump, the combination therewith of a counter mechanism preliminarily operated by each operation of said reversing mechanism, a spring for actuating the counter mechanism to register each quantity, a detainer for restraining said counter mechanism after each casual operation of said reversing mechanism, a relay device for releasing said detainer, the supply of energy for actuating said device being dependent upon said motor being in operation, means subject to the state of discharge from said measuring chambers for controlling said relay device, starting and stopping means for said motor, and an interlock whereby operation of said means to stop the motor is prevented while said counter mechanism is restrained by said detainer.

17. In a liquid dispenser having twin measuring chambers, supply and discharge passages, automatic reversing mechanism whereby each of said chambers in turn is connected with the supply passage while the other is connected with the discharge passage, a pump for forcing the liquid through the supply passage, and a motor to drive said pump, the combination therewith of a counter mechanism preliminarily operated by each operation of said reversing mechanism, a spring for actuating the counter mechanism to register each quantity, a detainer for restraining said counter mechanism after each corresponding operation of said reversing mechanism, a lock for said reversing mechanism, means controlled by said counter mechanism whereby said lock is released at the end of each registering action, a relay device for releasing said detainer, the supply of energy for actuating said device being dependent upon said motor being in operation, starting and stopping means for said motor, and an interlock whereby operation of said means to stop the motor is prevented while said counter mechanism is restrained by said detainer and is permitted before the counter mechanism releases said lock.

18. In a liquid dispenser having twin measuring chambers, supply and discharge passages, automatic reversing mechanism whereby each of said chambers in turn is connected with the supply passage while the other is connected with the discharge passage, a pump for forcing the liquid through the supply passage, and a motor to drive said pump, the combination therewith of a counter mechanism preliminarily operated by each operation of said reversing mechanism, a spring for actuating the counter mechanism to register each quantity, a detainer for restraining said counter mechanism after each corresponding operation of said reversing mechanism, a relay device for releasing said detainer, the supply of energy for actuating said device being dependent upon said motor being in operation, means subject to the state of discharge from said measuring chambers for controlling said relay device, a starting and stopping arrangement for said motor, manually operated means adapted to actuate said arrangement and to be withdrawn therefrom, means whereby said arrangement is urged to the power-off condition, a detent for holding said arrangement in the power-on condition, said detent being releasable by withdrawal of said manually operated means, and an interlock between said arrangement and said counter mechanism whereby movement of said arrangement to the power-off condition is prevented while said counter-mechanism is restrained by said detainer.

19. In a liquid dispenser having twin measuring chambers, supply and discharge passages, automatic reversing mechanism whereby each of said chambers in turn is connected with the supply passage while the other is connected with the discharge passage, a pump for forcing the liquid through the supply passage, and a motor to drive said pump, the combination therewith of a counter mechanism preliminarily operated by each operation of said reversing mechanism, a spring for actuating the counter mechanism to register each quantity, a detainer for restraining said counter mechanism after each corresponding operation of said reversing mechanism, a lock for said reversing mechanism, means controlled by said counter mechanism whereby said lock is released at the end of each registering action, a relay device for releasing said detainer, a valve adapted to relieve said reversing mechanism and said relay device of the action of liquid to energize them, manually operated mechanism for controlling said valve, and an interlock between said control mechanism and said counter mechanism whereby movement of said control mechanism to the de-energizing condition is prevented while said counter mechanism is restrained by said detainer and is permitted before the counter mechanism releases said lock.

20. In a liquid dispenser having twin measuring chambers, supply and discharge passages, automatic reversing mechanism whereby each of said chambers in turn is connected with the supply passage while the other is connected with the discharge passage, a pump for forcing the liquid through the supply passage, and a motor to drive said pump, the combination therewith of a counter mechanism preliminarily operated by each operation of said reversing mechanism, a spring for actuating the counter mechanism to register each quantity, a detainer for restraining said counter mechanism after each corresponding operation of said reversing mechanism, a lock for said reversing mechanism, means controlled by said counter mechanism whereby said lock is released at the end of each registering action, a relay device for releasing said detainer, a valve adapted to relieve said reversing mechanism and said relay device of the action of liquid to energize them, mechanism for controlling said valve, manually operated means adapted to actuate said control mechanism and to be withdrawn therefrom, means whereby said control mechanism is urged to the de-energizing condition, a detent for holding said control mechanism in the energizing condition, said detent being releasable by withdrawal of said manually operated means, and an interlock between said control mechanism and said counter mechanism whereby movement of said control mechanism to the de-energizing condition is prevented while said counter mechanism is restrained by said detainer and is permitted before the counter mechanism releases said lock.

21. In a liquid dispenser having twin measuring chambers, supply and discharge passages, and automatic reversing mechanism whereby each of said chambers in turn is connected with the supply passage while the other is connected with the discharge passage, the combination of a counter mechanism initially operated by said reversing mechanism, means for delaying the registering action of said counter mechanism beyond each corresponding operation of said reversing mechanism, a lock for said reversing mechanism, and means actuated by said counter mechanism to release said lock.

22. In a liquid dispenser having twin measuring chambers, supply and discharge passages, and automatic reversing mechanism whereby each of said chambers in turn is connected with the supply passage while the other is connected with the discharge passage, the combination of a counter mechanism initially operated by said reversing mechanism, means governed by conditions in said discharge passage to delay the registering action of said counter mechanism beyond each corresponding operation of said reversing mechanism, a lock for said reversing mechanism, and means actuated by said counter mechanism at the conclusion of the registering action to release said lock.

23. In a liquid dispenser having twin measuring chambers, supply and discharge passages, and automatic reversing mechanism whereby each of said chambers in turn is connected with the supply passage while the other is connected with the discharge passage, the combination of a counter mechanism initially operated by said reversing mechanism, a detainer for restraining said counter mechanism from effecting registration, an automatic device for releasing said detainer, a lock for said reversing mechanism, and means actuated by said counter mechanism to release said lock.

24. In a liquid dispenser having twin measuring chambers, supply and discharge passages, and automatic reversing mechanism whereby each of said chambers in turn is connected with the supply passage while the other is connected with the discharge passage, the combination of a counter mechanism initially operated by said reversing mechanism, a detainer for restraining said counter mechanism from effecting registration, a lock for said reversing mechanism, means actuated by said counter mechanism to release said lock after said detainer has been released and registration has been effected, and means controlling said detainer in response to alternating conditions in said discharge passage.

25. In a liquid dispenser having twin measuring chambers, supply and discharge passages, and automatic reversing mechanism whereby each of said chambers in turn is connected with the supply passage while the other is connected with the discharge passage, the combination of a counter mechanism initially operated by said reversing mechanism, a detainer for restraining said counter mechanism from effecting registration, a lock for said reversing mechanism, means actuated by said counter mechanism to release said lock after said detainer has been released and registration has been effected, a fluid-pressure device controlling said detainer, a conduit for connecting said device with a source of liquid under pressure, a valve in said conduit, and valve operating means governed by the liquid discharged from the measuring chambers.

26. In a liquid dispenser having twin measuring chambers, supply and discharge passages, and automatic reversing mechanism whereby each of said chambers in turn is connected with the supply passage while the other is connected with the discharge passage, the combination therewith of a counter mechanism, means for actuating the same to register the successive measured quantities, a lock for said reversing mechanism, which lock is controlled by said counter mechanism, and means governed by the liquid discharged from the measuring chambers and controlling said actuating means so that each quantity is registered and said lock is then released after such quantity leaves its measuring chamber.

27. In a liquid dispenser having twin measuring chambers, supply and discharge passages, and automatic reversing mechanism whereby each of said chambers in turn is connected with the supply passage while the other is connected with the discharge passage, the combination therewith of a counter, a counter-actuator having a reciprocal motion by the return stroke of which the counter is actuated, a spring for effecting said stroke, means actuated by each operation of said reversing mechanism to produce an initial stroke of said counter-actuator, a detainer for restraining the counter-actuator from executing its return stroke, a lock for said reversing mechanism, means whereby said lock is released at the conclusion of said return stroke, a fluid-actuated device for releasing said detainer, a valve controlling said device, and means controlled by the measured and discharging quantities for operating said valve.

28. In a liquid dispenser having twin measuring chambers, supply and discharge passages, and automatic reversing mechanism whereby each of said chambers in turn is connected with the supply passage while the other is connected with the discharge passage, the combination of a counter mechanism, a mechanical lock for said reversing mechanism controlled by said counter mechanism, and means for controlling said counter mechanism in response to conditions in the discharge passage.

29. In a liquid dispenser having twin measuring chambers, supply and discharge passages, reversing mechanism for connecting each chamber in turn with the supply passage while the other is connected with the discharge passage, and a lock for said reversing mechanism: a liquid-pressure device for releasing said lock, a conduit connecting said device with a source of liquid under pressure, a valve controlling said device, and means governed by the state of discharge for operating said valve.

30. In a liquid dispenser having twin measuring chambers, supply and discharge passages, reversing mechanism for connecting each chamber in turn with the supply passage while the other is connected with the discharge passage, and a lock for said reversing mechanism: a liquid-pressure device for releasing said lock, a conduit connecting said device with said supply passage, a valve controlling said conduit, and control connections between said valve and said discharge passage.

31. In a liquid dispenser of the type having twin measuring chambers, automatic reversing mechanism whereby each chamber in turn is filled while the other is discharging and a counter for registering the measured quantities: An automatic control for said reversing mechanism and/or said counter comprising a float chamber communicating with a space through which the measured quantities are discharged, said chamber having a vent, a float in said chamber, a fluid-actuated device, a duct for conducting actuating fluid to said device, a valve in said duct connected to said float, and means whereby the float closes said vent before the float reaches its upper position.

32. In a liquid dispenser of the type having twin measuring chambers, automatic reversing mechanism whereby each chamber in turn is filled while the other is discharging and a counter for registering the measured quantities: An automatic control for said reversing mechanism and/or said counter comprising a float chamber communicating with a space through which the measured quantities are discharged, a float in said chamber, a cylinder and piston, a duct for conducting actuating liquid to said device, a drain-back connected with said cylinder, and a valve in said duct connected to said float.

33. In a liquid dispenser of the type having twin measuring chambers, automatic reversing mechanism whereby each chamber in turn is filled while the other is discharging and a counter for registering the measured quantities: An automatic control for said reversing mechanism and/or said counter comprising a float chamber communicating with a space through which the measured quantities are discharged, a float in said chamber, a cylinder and piston, a duct for conducting actuating liquid to said device, drain-backs connected with said cylinder at both sides of the piston, and a valve in said duct connected to said float.

34. In a liquid dispenser of the type having twin measuring chambers, automatic reversing mechanism whereby each chamber in turn is filled while the other is discharging and a counter for registering the measured quantities: An automatic control for said reversing mechanism and/or said counter comprising a float chamber communicating with a space through which the measured quantities are discharged, a float in said chamber, a fluid-actuated device directly over said float chamber, a connection between said float chamber and said fluid-actuated device, said connection containing a portion of a duct for supplying said device with actuating fluid, and a valve member connected to said float and operating in said duct.

35. In a liquid dispenser of the type having twin measuring chambers, automatic reversing mechanism whereby each chamber in turn is filled while the other is discharging and a counter for registering the measured quantities: An automatic control for said reversing mechanism and/or said counter comprising a float chamber communicating with a space through which the measured quantities are discharged, a float in said chamber, a fluid-actuated device, a duct for conducting actuating fluid to said device, and a valve connected with said float and operating in said duct near the entrance to said device.

36. In a liquid dispenser, the combination of twin measuring chambers, supply and discharge passages, a valve mechanism whereby each chamber in turn is connected alternately with said supply and discharge passages, a counter, means controlled by the discharging quantities to cause said counter to register each quantity after it leaves its measuring chamber, and means for automatically actuating said valve mechanism independently of said counter.

37. In a liquid dispenser, the combination of twin measuring chambers, supply and discharge passages, automatic reversing mechanism whereby each chamber in turn is connected alternately with said supply and discharge passages, a counter, means controlled by the discharging quantities to cause said counter to register each quantity after it leaves its measuring chamber, and means for rendering said reversing mechanism inactive without affecting a subsequent operation of the counter.

38. In a liquid dispenser, the combination of twin measuring chambers, supply and discharge passages, a reversing mechanism whereby each chamber in turn is connected alternately with said supply and discharge passages, said reversing mechanism being operated by pressure developing on the liquid when each chamber is filled, a counter, counter-operating means, a float chamber connected with the discharge conduit, a float in said chamber, and means controlled by said float and governing the operation of said counter.

39. In a liquid dispenser, the combination of twin measuring chambers, supply and discharge passages, a reversing mechanism whereby each chamber in turn is connected alternately with said supply and discharge passages, a counter, an oscillatory counter-actuator, a spring for effecting the registering movements of said counter-actuator, means for moving the counter-actuator in the idle direction and for detaining said counter-actuator against the action of said spring, a float subject to the quantities passing through the discharge conduit, and means controlled by said float so as to release said counter-actuator and spring when each quantity has passed out of its measuring chamber.

40. A measuring liquid dispenser of the type described, having supply and discharge conduits, an automatic reversing mechanism, a lock for said reversing mechanism, and means for controlling said lock from a float and float chamber, characterized in that the float chamber is directly connected and on a level with a region at or close to the entrance to the discharge conduit.

41. A measuring liquid dispenser of the type described, having supply and discharge conduits, a reversing slide valve having spaced pistons, mechanism for automatically actuating said slide valve, a lock for said mechanism, and means for controlling said lock from a float and float chamber, characterized in that the float chamber is directly connected and on a level with the space between the pistons of said valve.

42. A measuring liquid dispenser of the type described, having twin measuring chambers, supply and discharge conduits, an automatic reversing mechanism, a lock for said reversing mechanism, and means for controlling said lock, said means comprising a float and float chamber subject to the liquid discharged from said measuring chambers, a valve operated by said float, and a fluid-operated device controlled by said valve, characterized in that said fluid-operated device is closely connected with said valve.

43. A measuring liquid dispenser of the type described, having twin measuring chambers, supply and discharge conduits, an automatic reversing mechanism, a lock for said reversing mechanism, and means for controlling said lock, said means comprising a float and float chamber subject to the liquid discharged from said measuring chambers, a valve operated by said float, and a fluid-operated device controlled by said valve, characterized in that said float chamber is directly connected with a region close to the entrance to the discharge conduit, and that said fluid-operated device is closely connected with said valve.

WALTER H. HAUPT.